United States Patent

Onozuka et al.

[11] 3,937,682
[45] Feb. 10, 1976

[54] STRESS-SENSITIVE COMPOSITION

[75] Inventors: Mitsuo Onozuka; Koki Nomoto; Koji Sato, all of Iwaki, Japan

[73] Assignee: Kureha Kagaku Kogyo Kabushiki Kaisha, Tokyo, Japan

[22] Filed: Oct. 30, 1974

[21] Appl. No.: 519,276

Related U.S. Application Data

[63] Continuation of Ser. No. 436,593, Jan. 24, 1974, abandoned.

[30] Foreign Application Priority Data

Oct. 5, 1971    Japan................................ 46-78125

[52] U.S. Cl. .......... 260/42.24; 106/306; 260/42.46; 264/49; 423/512 A
[51] Int. Cl.² ...................... C08K 3/30; C01B 17/00
[58] Field of Search ........ 260/42.24, 42.46; 264/49; 106/306; 423/512

[56] References Cited

UNITED STATES PATENTS

| | | | |
|---|---|---|---|
| 1,343,897 | 6/1920 | Barstow | 423/512 |
| 2,210,405 | 8/1940 | Haywood | 423/512 |
| 2,375,786 | 5/1945 | Haywood et al. | 423/512 |
| 2,453,099 | 11/1948 | Rafton | 423/512 X |
| 3,553,302 | 1/1971 | Susuki et al. | 264/49 |
| 3,653,812 | 4/1972 | Schneider et al. | 423/242 |
| 3,687,890 | 8/1972 | Susuki et al. | 260/42.46 X |

*Primary Examiner*—Murray Tillman
*Assistant Examiner*—T. DeBenedictis, Sr.
*Attorney, Agent, or Firm*—Holman & Stern

[57] ABSTRACT

A composition for forming into a soft, pliable, leather-like material includes a polyolefine having from 50 to 90 weight percent of inorganic compounds. The inorganic compounds contain a substantial amount of calcium sulfite having crystal sizes of 1–100 μ.

2 Claims, No Drawings

STRESS-SENSITIVE COMPOSITION

BACKGROUND OF THE INVENTION

This is a continuation, of application Ser. No. 436,593, filed Jan. 24, 1974, now abandoned.

This invention relates to formed compositions capable of becoming soft and pliable when subjected to mechanical stresses, especially bending and/or torsional stresses.

Leathers manufactured through tanning of natural raw hides or the like still exhibit considerable rigidity against bending or other mechanical stresses and become soft and pliable only upon being subjected to artificial and partial fiber separation on a crumpling machine.

It is further known to make barks, wooden flake or sheetlike materials, bamboo and paper materials soft and pliable by subjecting them to repeated bending stresses.

Since the natural vegetable or animal fiber represents a bonded combination of fibrous materials with natural binders such as tannin containing substance, lignin-containing substance, bonding substance or the like, partial collapse will generally occur in the bonds by subjecting these fibers to repeated bending or the like severe mechanical stresses, thus loosening substantially the rigidity.

When it is desired to manufacture artificial products made of chemical composition which may become soft and pliable by subjecting to severe mechanical stresses, the first step is generally to prepare suitable fibers for the desired purpose which may naturally be highly troublesome and difficult to realize.

SUMMARY OF THE INVENTION

It is therefore the main object of the present invention to provide a formed product made of a chemical composition which can be made pliable upon subjecting to severe mechanical stresses as similarly occur to leather, paper and the like fiber-containing products.

It has been now found that when a shaped material is prepared from a composition of a polyolefine, containing 50–90 wt.% of inorganic compounds having as their main component calcium sulfite by thermal fusing and shaping, the thus prepared and shaped products can be easily made soft and pliable as in the case of leather, paper, wooden or bamboo products, upon subjecting them to severe mechanical stresses, especially bending stresses.

These prepared and shaped products exhibit at least a 20%-elongation when subjected to tension under normal temperature.

It has been further found that these products exhibit a unique characteristic that when their softening temperature is measured in a repeated manner as prescribed by JIS, K-6723, there is a remarkable difference amounting to at least 10°C between the firstly and secondly measured values, the former being higher than the latter.

Products exhibiting these unique characteristics can not be obtained if prepared from a composition of commercially available calcium sulfite with polyolefine combined in the similar ratio as proposed by the present invention.

The products prepared by a composition of commercially available calcium sulfite and any polyolefine mixed in the similar ratio as proposed by the invention will show a substantially unfavorable value of elongation such as 10 percent or so, and are liable to be broken when subjected to severe bending stresses. Upon repeated measurements of the softening temperature, they will show no appreciable difference.

In the practice of the present invention, the inorganic compound including as its main constituent, calcium sulfite having crystalline particle sizes of 1 – 100 $\mu$ and prepared by the reaction of alkali of ammonium bisulfite with calcium carbonate may be used, while, as the remaining component of the starting composition, a crystalline polyolefine of melt index of less than 10 may be used. These two components are shaped into desired products at an elevated temperature higher than the melting point of the polyolefine.

As commonly known, calcium sulfite may be prepared in other ways, for instance, by reaction of gaseous sulfur dioxide and calcium hydroxide; by reaction of alkali bisulfite and calcium hydroxide; or by reaction of alkali bisulfite and calcium chloride. According to our experimental results, however, it has been found highly difficult to prepare the desired kind of products capable of showing the unique physical properties as mentioned hereinbefore, by use of the conventionally prepared calcium sulfite as above.

Alkali bisulfite or ammonium bisulfite may be prepared through absorption of gaseous sulfur dioxide by alkali sulfite or ammonium sulfite, as the case may be. Generally speaking in this case, a mixture of the corresponding bisulfite and the corresponding sulfite will be produced, but such mixture can be used as per se in the aforementioned reaction with calcium carbonate.

The obtained crystalline calcium sulfite may have various particle sizes, depending upon the overall concentration of the alkali (ammonium) salt in the reaction system, reaction temperature, pH, and/or the amount of included impurities, and the crystal form of the calcium sulfite may be of needle, granule or spheroid, depending upon the reaction conditions. However, the desired products may be easily found out by slight test experiments.

The crystals may preferably be such as lateral or smaller dimensions of 1–30 $\mu$ and axial or larger dimensions of 5–100 $\mu$.

The calcium sulfite may be used in combination with other inorganic compounds such as gypsum, calcium carbonate, ferric oxide, zinc oxide, silica sand, regular sand, kieselguhr, talc or the like. However, the mixing ratio must preferably be less than 30 wt.% of the total amount of the inorganic substances employed.

The polyolefine employed in the present composition may be a polymer or copolymer of ethylene or propylene as its main constituent, having a melt index less than 10 and superior crystallinity.

Suitable copolymerizable constituents include, for example, olefines such as ethylene, propylene, butene, pentene and/or the like: halogenated olefine(s) such as vinyl fluoride, fluorochloroethylene, tetrachloroethylene and/or the like, and/or other unsaturated compound(s) copolymerizable with ethylene such as vinyl acetate, alkyl (meth) acrylate and/or the like.

The primary shaped product of the present invention can be, as was referred to above, made soft and pliable by subjecting to severe mechanical stresses, preferably bending stresses. When the product is stretched mechanically and monoaxially, the polymer can be stretched and oriented, while effecting partial interfa-

3 cial separation between the polymer or copolymer and the inorganic component(s).

The thus stretched product generally is in the form of a soft, porous and pliable, leather-like sheet, exhibiting a substantially intensified tensile strength.

The primary product can be nailed without breakage, sawed and mechanically sliced and/or planed as desired.

Since the primary product possesses a substantial bending resistance, it can be used as artificial wood for utilization in various industrial fields, especially for furniture production. This product can be shaped into various forms through injection or the like thermally shaping technique. Mechanical cutting, carving and/or the like finish-working can be well applied for instance, for the manufacture of high class furniture.

The secondary product can be provided by making the primary product soft and pliable by subjecting to severe mechanical stresses, especially bending stresses. Especially usable is a product which has a $T_f$-point less than $-50°C$.

The secondary product exhibits a superior pliable nature comparative to soft rubber sheet, although it contains 50 wt.% or more inorganic substance, it exhibits other further, superior mechanical properties such as anti-shock performance. Thus, it can be utilized in various industrial fields.

The mode of application of severe mechanical stresses for the manufacture of the secondary product may be various and different.

As an example, bending stresses can be applied in a repeated manner by moving the point of application along an axis of a sheetlike product. Torsional stresses may also be applied so as to subject the material evenly and throughly thereof by threading or crumpling, as an example.

DETAILED DESCRIPTION OF PREFERRED EMBODIMENTS

EXAMPLE 1

Preparation of inorganic constituent

In a reaction vessel, fitted with glass lining and a mechanical agitator, 300 r.p.m. having a chargeable content of 10 lit, sodium bisulfite 520 g and sodium sulfite 975 g were charged upon dissolving in 6.5 lit. of water. The reaction mixture was warmed up to 60°C. Next, 250 g of calcium carbonate, which had been screened through a 400-mesh screen, were gradually added in powder form, and brought into reaction for about an hour under enough agitation, until substantially no development of carbon dioxide gas was observed.

pH was observed at the beginning of the reaction as 6.5, while it became 7.6 at the completion of the reaction.

Upon completion of the reaction, the sedimented calcium sulfite was filtered off, washed with water, dehydrated several times, and dried up with heated air, 130°C.

In this way, hemihydrate calcium sulfite was obtained in fine crystals of lateral or smaller grain size: 5–15 $\mu$: axial or larger grain size: 30–50 $\mu$. Yield: 98.7%.

EXAMPLE 2

Preparation of primary product

Commercially available low-pressure polyethylene, of melt index 0.3, in the state of fine powder, was mixed in dry condition with calcium sulfite prepared in the foregoing Example 1, and compounded on a calendering machine, having a roll temperature of 150°–160°C. for about 5 minutes, so as to provide a sheet, 1 mm thick.

The sheet was cut into sizes of 15 × 15 cm. Two sheets thus cut were squeezed in their overlapped state between a pair of chromium-coated steel plates, and pressed on a hot press, load 150 kgs./cm², at 180°C for 5 minutes, so as to provide a unitary sheet of 1 mm.

The torsional rigidity was measured under the prescribed condition in JIS, K-6745 on various sheets thus prepared.

The measured softening temperatures were listed in the following Table I

As seen, the firstly measured softening temperatures were 5.0°C:−9.0°C: and −39.0°C, while the secondly measured values were −58°C; less than −100°C and less than −100°C, for Samples 1–1;1–2; and 1–3, respectively.

Thus, a substantial decrease of the softening point was observed between the corresponding two measurements.

Such a remarkable phenomenon was not found in the case of products using commercially available calcium sulfite, having finer grain sizes of several microns or so. See, reference Sample 1–4.

EXAMPLE 3

Preparation of primary product

Commercially available crystalline polyethylene, of melt index 0.3, in the state of fine powder, was mixed in dry condition with calcium sulfite prepared in the foregoing Example 1, and commercially available calcium bicarbonate, of 0.1 – 50 $\mu$ grain sizes, and compounded on a calendering machine, having a roll temperature of 150° – 160°C. for about 5 minutes, so as to provide a sheet, 1 mm thick.

Further treatments were carried out as in the foregoing Example 2, and softening temperature was measured as shown in the following Table II.

Addition of the calcium carbonate component in relatively minor amounts did not adversely affect the desired results to any significant extent.

However, this addition showed no special advantage. It was observed that an excess addition of the calcium carbonate component could have an adverse effect upon the desired results.

Table 1

| | | Physical Properties of Composite Materials of PE/CaSO$_3$ . ½H$_2$O | | | |
|---|---|---|---|---|---|
| | | Tensile* | Break-* | Temp. Tf, °C | |
| Sample No. | Composition (wt.%) | Breaking Strength (kg/cm²) | Breaking Elongation (%) | 1st Measurement | 2nd Measurement |
| | PE    CaSO$_3$ . ½H$_2$O | | | | |

Table 1-continued

Physical Properties of Composite Materials of PE/CaSO₃ · ½H₂O

| Sample No. | Composition (wt.%) | | Tensile* Breaking Strength (kg/cm²) | Break-* ing Elongation (%) | Temp. Tf, °C | |
|---|---|---|---|---|---|---|
| | | | | | 1st Measurement | 2nd Measurement |
| 1-1 | 40 | 60 | 88 | 250 | 5.0 | −58°C |
| 1-2 | 30 | 70 | 65 | 400 | −9.0 | less than −100°C |
| 1-3 | 20 | 80 | 46 | 50 | −39.0 | less than −100°C |
| Reference 1-4 | 30 | Commercial Calcium Sulfite, particle sizes, less than several Microns 70 | 63 | 5 | 31 | 28 |

*As measured under the specified conditions in Japanese Industrial Standards, K-6771, under a winding speed of 200 mm/min.

Table II

Physical Properties of Composite Materials of PP/CaSO₃ & CaCO₃

| Sample No. | Composition (wt.%) | | | Tensile* Breaking Strength (kg/cm²) | Break-* ing Elongation (%) | Temp. Tf, °C | |
|---|---|---|---|---|---|---|---|
| | PP | CaSO₃ | CaCO₃ | | | 1st measurement | 2nd measurement |
| | 30 | 70 | 0 | 73 | 350 | −9 | less than −100°C |
| 2-1 | 30 | 66 | 4 | 70 | 290 | −8 | less than −100°C |
| 2-2 | 30 | 56 | 14 | 69 | 240 | −4 | less than −100°C |

*As measured under the specified conditions in Japanese Industrial Standards, K-6771, under a winding speed of 200 mm/min.

EXAMPLE 4

Preparation of secondary product

To 30 wt. parts of commercially available medium pressure polyethylene, melt index 6.0, 70 wt. parts of calcium sulfite prepared in the foregoing Example 1 were added and shaped into pellets which were processed on an injection machine at 200°C under 500 kgs/cm², for preparing plates, of dimensions of 1 cm × 5 cm × 10 cm.

Upon being cooled-down to room temperature, each plate was subjected to bending stresses sufficient to effect 90° — bends in a repeated manner, while shifting the stress application point along the central axis of the plate. The plate was inverted longitudinally and the same procedure was repeated.

The thus heavily and mechanically stressed plate finally recovered its planular shape, and was tested as before. The results are shown in the following Table III.

These results showed that the Sample 3-2, subjected to partial interfacial separation of the kind as referred to hereinbefore, exhibited a substantial decrease in its bending strength and was made soft and pliable to a substantial degree, thus having been improved in its desired effect.

When the Sample was cooled to −100°C and the bending strength again measured, no substantial changes were observed.

Table III

| Sample No. | Physical properties of shaped plate of PE/CaSO₃ | Strength, kgs/cm² | Elongation, % | Bending strength, kgs/cm² |
|---|---|---|---|---|
| 3-1 | Injection molded plates | 68 | 63 | 460 |
| 3-2 | Those heavily stressed after injection molded | 73 | 180 | 50 |

The embodiments of the invention in which an exclusive property or privelege is claimed are defined as follows:

1. A polyolefine formed product made of a composition comprising a polyolefine resin and 50–90 wt.% of hemihydrated calcium sulfite, prepared by reacting alkali bisulfite or ammonium bisulfite with calcium carbonate, having crystal sizes of 1 – 30 μ in the lateral or smaller dimension and 5 – 100μ in the axial or larger dimension, said formed product being capable of becoming soft and pliable when subjected to severe mechanical forces.

2. A soft and pliable polyolefine formed product having a softening point lower than −50°C and made of a composition comprising a polyolefine resin and 50–90 wt.% of hemihydrated calcium sulfite, prepared by reacting alkali bisulfite or ammonium bisulfite with calcium carbonate, of crystal sizes of 1 – 30 μ in the lateral or smaller dimension and 5 – 100 μ in the axial or larger dimension.

* * * * *